UNITED STATES PATENT OFFICE.

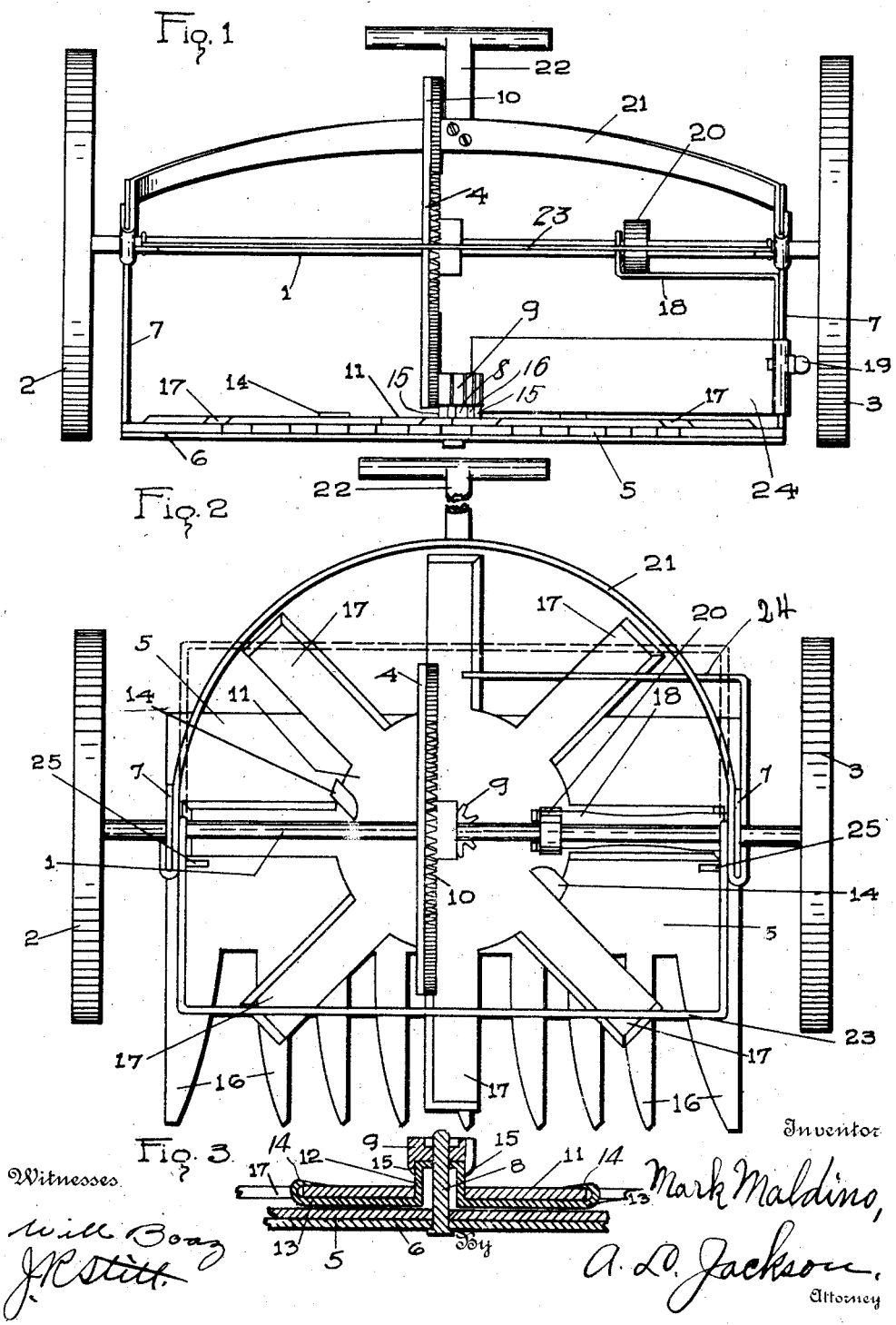

MARK MALDINO, OF FORT WORTH, TEXAS.

LAWN-MOWER.

990,998. Specification of Letters Patent. Patented May 2, 1911.

Application filed August 12, 1910. Serial No. 576,917.

*To all whom it may concern:*

Be it known that I, MARK MALDINO, a citizen of the United States, residing at Fort Worth, in the county of Tarrant and State of Texas, have invented a new and Improved Lawn-Mower, of which the following is a specification.

My invention relates to lawn mowers, and the object is to provide such mowers at small cost and to provide mowers which will be durable and easily operated. One of the advantages will be that the mower contains but few parts and the blades are long so that the cutting will be more certain and effective. Another advantage is that the driving gear for the blades may be disconnected quickly and connected quickly so that it will not be necessary to run the blades when no grass is to be cut, as when moving from place to place.

Other objects and advantages will be fully explained in the following description and the invention will be more particularly pointed out in the claims.

Reference is had to the accompanying drawings which form a part of this application.

Figure 1 is a front elevation of the mower. Fig. 2 is a plan view of the same. Fig. 3 is detail sectional view of the blades and their driving pinion and the bearing frame, the parts being exaggerated to show the construction clearly.

Similar characters of reference are used to indicate the same parts throughout the several views.

The improved lawn mower is provided with an axle 1 and wheels 2 and 3 rigid therewith. A drive wheel 4 is also rigid with the axle 1. A stationary cutter 5 is rigid with a supporting bar 6 and the bar 6 is suspended from the axle 1 by bearing arms 7 which are axially movable on axle 1. A spindle or shaft 8 is rigid with the bar 6 and the stationary cutter 5. A pinion 9 is loosely mounted on the spindle 8 and is driven by the wheel 4 which has face cogs 10 to mesh with the pinion. The pinion 9 drives the rotary cutter 11 and is made rigid therewith. A yoke bearing 12 extends down and under the cutter 11 and the ends 14 of the arms 13 are bent upwardly and clenched on the cutter 11. The yoke 12 is perforated to form a bearing for the cutter 11 to receive the spindle 8. The pinion 9 has lugs 15 which engage the yoke 12 and the yoke 12 may be riveted to the lugs. The lugs 15 are extensions of two teeth of the pinion 9.

The stationary cutter 5 has a plurality of blades 16 and the rotary cutter 11 has a plurality of blades 17 the lower surface of which runs in close proximity to the upper surface of the blades 16. When the pinion 9 is in mesh with the cogs 10 of wheel 4, the blades 17 will be driven on every movement of the wheels 2 and 3. Means are provided for throwing the pinion 9 in and out of mesh with the wheel 10. A spring holder 18 is attached to one of the arms 7 by means of a thumb clamp 19. A collar 20 is rigid with the axle 1. Both cutters and the pinion 9 are carried on and movable with the bar 6 and arms 7. In the positions shown in the drawings the holder 18 will hold the pinion 9 in mesh with the cogs 10. The holder 18 is forked and engages the axle 1. If it is desirable to move the mower without operating the same, the clutch 18 may be sprung downwardly and the arms 7 shifted axially to bring the holder on the other side of the collar 20. The pinion 9 will then be out of mesh with the cogs 10 and the rotary cutter 11 will not run. The pinion 9 may be again brought in mesh by shifting the arms 7 axially on the axle 1. The holder 18 is sprung downwardly and held down while the arms 7 are shifted axially on the axle 1. When the clutch is released it will engage the axle 1.

A yoke 21 and a handle 22 attached thereto are provided for operating the mower. The yoke 21 may be rigidly attached to the arms 7.

A bail or fender 23 is pivotally connected to the axle 1 and serves to press the grass forward so that it will not clog the gearing or gear wheels 9 and 10. When there is no high grass the bail 23 may be swung back against yoke 21 to the dotted outline position shown in Fig. 2. A fender 24 is attached to the rear left side of the mower to prevent the grass from being thrown from the rear through the machine toward the front by the rotary cutter 11. This fender 24 may be clamped on the arm 7 by the thumb clamp 19.

The mower is operated by shoving on the handle 22 and the machine may be reversed, that is, inverted, and operated as well as in the normal position. This may be of advantage in high grass. The mower can be operated with the blades held in a vertical position while machine is traveling.

Having fully described my invention, what I claim as new and desire to secure by Letters Patent, is,—

1. A lawn mower having an axle and supporting wheels rigid therewith, a frame suspended loosely on said axle, a stationary cutter provided with a plurality of blades rigid with said frame, a spindle rigid with said frame, a rotary cutter provided with a plurality of blades, a bearing yoke rigid with said rotary cutter and having a portion thereof bent upwardly to form a bearing to engage said spindle loosely, a pinion mounted loosely on said spindle and provided with lugs engaging said bearing to make said pinion rigid with said rotary cutter, a gear wheel rigid with said axle and meshing with said pinion, and means for throwing said pinion in or out of mesh with said cog wheel.

2. A lawn mower having an axle and supporting wheels rigid therewith, a frame suspended loosely on said axle, a stationary cutter provided with a plurality of blades rigid with said frame, a spindle rigid with said frame, a rotary cutter provided with a plurality of blades running in close proximity to said stationary cutter, a bearing yoke rigid with said rotary cutter and having a portion thereof bent up through said rotary cutter to form a bearing to engage said spindle loosely, a pinion loosely mounted on said spindle and having lugs engaging said bearing yoke, a gear wheel rigid with said axle and having cogs meshing with said pinion, means for throwing said pinion in or out of mesh with said cog wheel, and a fender attached to said frame and projected over the forward moving portion of said rotary cutter.

3. A lawn mower having an axle and supporting wheels rigid therewith, a frame loosely mounted on said axle, a stationary cutter provided with a plurality of blades rigid with said frame, a gear wheel rigid with said axle, a spindle rigid with said frame, a rotary cutter mounted loosely on said spindle, a pinion on the spindle and rigid with said rotary cutter and adapted to mesh with said gear wheel, a bail loosely engaging said axle and projected in front of said drive wheel and pinion and adapted to swing back when not in use, and means for holding said pinion in or out of mesh with said gear wheel consisting of a collar rigid with said axle and a spring holder attached to said frame and having a notch in the end thereof to engage said axle on either side of said collar.

In testimony whereof, I set my hand in the presence of two witnesses, this 23rd day of July, 1910.

MARK MALDINO.

Witnesses:
A. L. JACKSON,
J. W. STITT.